United States Patent
Moyer et al.

(10) Patent No.: US 11,743,293 B2
(45) Date of Patent: Aug. 29, 2023

(54) REMOTE ATTESTATION TRANSPORT LAYER SECURITY AND SPLIT TRUST ENCRYPTION

(71) Applicant: Google LLC, Mountain View, CA (US)

(72) Inventors: Keith Moyer, Kirkland, WA (US); Benjamin Seth Moore, Redmond, WA (US); Ari Medvinksy, Mountain View, CA (US); Kevin Yap, Bellevue, WA (US); Ivan Petrov, London (GB); Tiziano Santoro, London (GB); Ariel Joseph Feldman, Forest Hills, NY (US); Marcel Catalin Rosu, Mount Klsco, NY (US)

(73) Assignee: Google LLC, Mountain View, CA (US)

( * ) Notice: Subject to any disclaimer, the term of this patent is extended or adjusted under 35 U.S.C. 154(b) by 210 days.

(21) Appl. No.: 17/305,958

(22) Filed: Jul. 19, 2021

(65) Prior Publication Data
US 2023/0013347 A1    Jan. 19, 2023

(51) Int. Cl.
*H04L 29/06* (2006.01)
*H04L 9/40* (2022.01)
*H04L 9/08* (2006.01)
*H04L 9/32* (2006.01)

(52) U.S. Cl.
CPC ............ *H04L 63/166* (2013.01); *H04L 9/083* (2013.01); *H04L 9/085* (2013.01); *H04L 9/0861* (2013.01); *H04L 9/0894* (2013.01); *H04L 9/3236* (2013.01); *H04L 63/0823* (2013.01)

(58) Field of Classification Search
CPC ...................................................... H04L 63/166
See application file for complete search history.

(56) References Cited

U.S. PATENT DOCUMENTS

| | | | | |
|---|---|---|---|---|
| 5,535,276 | A | * | 7/1996 | Ganesan ............... H04L 9/0825 380/46 |
| 10,581,591 | B1 | * | 3/2020 | Branton ............... H04L 9/3239 |
| 2012/0121088 | A1 | * | 5/2012 | Hata ..................... H04L 9/0836 380/255 |

(Continued)

OTHER PUBLICATIONS

International Search Report and Written Opinion for the related Application No. PCT/US2022/073768, dated Dec. 22, 2022, 17 pages.

(Continued)

*Primary Examiner* — Bradley W Holder
(74) *Attorney, Agent, or Firm* — Honigman LLP; Brett A. Krueger

(57) ABSTRACT

A method for remote attestation includes establishing, using a cryptographic protocol, a communication session between a first computing device and a second computing device. The communication session includes communications encrypted by an ephemeral session key. The method includes receiving, at the first communication device via the communication session, from the second computing device, an attestation request requesting the first computing device to provide an attestation report. The method includes generating, by the first computing device, the attestation report based on the ephemeral session key and sending, using the communication session, the attestation report to the second computing device.

3 Claims, 6 Drawing Sheets

(56) References Cited

U.S. PATENT DOCUMENTS

2021/0306139 A1\* 9/2021 Wright ................. H04L 9/0869

OTHER PUBLICATIONS

Thomas Knauth et al: "Integrating Remote Attestation with Transport Layer Security", arxiv.org, Cornell University Library, 201 Olin Library Cornell University Ithaca, NY 14853, Jan. 17, 2018 (Jan. 17, 2018), XP081449772, 14 pages.
Ketan Bhardwaj et al: "SPX: Preserving End-to-End Security for Edge Computing", arxiv.org, Cornell University Library, 201 Olin Library Cornell University Ithaca, NY 14853, Sep. 24, 2018 (Sep. 24, 2018), XP080920588, 14 pages.

\* cited by examiner

REMOTE ATTESTATION TRANSPORT LAYER SECURITY AND SPLIT TRUST ENCRYPTION

TECHNICAL FIELD

This disclosure relates to remote attestation over a protocol such as Transport Layer Security.

BACKGROUND

Trusted execution environments refer to a secure area of a processor that guarantees that code and data loaded within the environment are protected with regards to integrity and confidentiality from the rest of the processor or device. A crucial advantage of trusted execution environments is the capability to perform remote attestation. Remote attestation involves a method by which a first computing device (e.g., a client) authenticates its own software and/or hardware to a remote second computing device (e.g., a server). That is, remote attestation allows a remote entity to challenge a device in order to obtain a level of trust in the integrity of the device. For example, remote attestation may allow a server to determine whether a client is running software with unauthorized changes.

SUMMARY

One aspect of the disclosure provides a computer-implemented method for remote attestation that, when executed by data processing hardware of a first computing device causes the data processing hardware to perform operations. The operations include establishing, using a cryptographic protocol, a communication session between the first computing device and a second computing device. The communication session includes communications encrypted by an ephemeral session key. The operations also include receiving, via the communication session, from the second computing device, an attestation request requesting the first computing device provide an attestation report and generating the attestation report based on the ephemeral session key. The operations further include sending, using the communication session, the attestation report to the second computing device.

Implementations of the disclosure may include one or more of the following optional features. In some implementations, the cryptographic protocol includes a Transport Layer Security (TLS) protocol. In some examples, generating the attestation report based on the ephemeral session key includes generating, using the ephemeral session key, a token and signing the generated token with an attestation key. In this example, the authenticity of the attestation key may be confirmed by a third party. Optionally, the authenticity is confirmed via a certificate issued by the third party.

In some implementations, generating the attestation report based on the ephemeral session key includes generating a derived key derived from the ephemeral session key and including the derived key within the report or signing the attestation report with the derived key. The operations may further include, prior to establishing the communication session between the first computing device and the second computing device, establishing, using an outer cryptographic protocol, an outer communication session between the first computing device and the second computing device. Establishing the communication session between the first computing device and the second computing device may include establishing an inner communication session within the outer communication session using an inner cryptographic protocol. In some examples, at least one of the inner cryptographic protocol and the outer cryptographic protocol include a Transport Layer Security (TLS) protocol.

Optionally, the operations further include sending, via the communication session, to the second computing device, a second attestation request requesting the second computing device provide a second attestation report and receiving, via the communication session, the second attestation report from the second computing device. The operations may also further include authenticating the second attestation report using the ephemeral session key.

In some implementations, the operations further include, after sending the attestation report to the second computing device, receiving, from the second computing device, a first portion of a data encryption key and receiving, from a third computing device, a second portion of the data encryption key, the second portion different than the first portion. The operations may also further include combining the first portion of the data encryption key and the second portion of the data encryption key and decrypting data using the combined data encryption key.

Another aspect of the disclosure provides a system for remote attestation. The system includes data processing hardware of a first computing device and memory hardware in communication with the data processing hardware. The memory hardware stores instructions that when executed on the data processing hardware cause the data processing hardware to perform operations. The operations include establishing, using a cryptographic protocol, a communication session between the first computing device and a second computing device. The communication session includes communications encrypted by an ephemeral session key. The operations also include receiving, via the communication session, from the second computing device, an attestation request requesting the first computing device provide an attestation report and generating the attestation report based on the ephemeral session key. The operations further include sending, using the communication session, the attestation report to the second computing device.

This aspect may include one or more of the following optional features. In some implementations, the cryptographic protocol includes a Transport Layer Security (TLS) protocol. In some examples, generating the attestation report based on the ephemeral session key includes generating, using the ephemeral session key, a token and including the derived key within the report or signing the generated token with an attestation key. In this example, the authenticity of the attestation key may be confirmed by a third party. Optionally, the authenticity is confirmed via a certificate issued by the third party.

In some implementations, generating the attestation report based on the ephemeral session key includes generating a derived key derived from the ephemeral session key and signing the attestation report with the derived key. The operations may further include, prior to establishing the communication session between the first computing device and the second computing device, establishing, using an outer cryptographic protocol, an outer communication session between the first computing device and the second computing device. Establishing the communication session between the first computing device and the second computing device may include establishing an inner communication session within the outer communication session using an inner cryptographic protocol. In some examples, at least one of the inner cryptographic protocol and the outer cryptographic protocol include a Transport Layer Security (TLS) protocol.

Optionally, the operations further include sending, via the communication session, to the second computing device, a second attestation request requesting the second computing device provide a second attestation report and receiving, via the communication session, the second attestation report from the second computing device. The operations may also further include authenticating the second attestation report using the ephemeral session key.

In some implementations, the operations further include, after sending the attestation report to the second computing device, receiving, from the second computing device, a first portion of a data encryption key and receiving, from a third computing device, a second portion of the data encryption key, the second portion different than the first portion. The operations may also further include combining the first portion of the data encryption key and the second portion of the data encryption key and decrypting data using the combined data encryption key.

Another aspect of the disclosure provides a computer-implemented method that, when executed by data processing hardware of a first computing device, causes the data processing hardware to perform operations. The operations include generating a data encryption key (DEK) and splitting the DEK into a plurality of DEK portions. Each DEK portion of the plurality of DEK portions representative of a portion of the DEK. The operations also include, for each respective DEK portion of the plurality of DEK portions, hashing the respective DEK portion and storing the respective hashed portion. The operations also include requesting a respective third party associated with the respective DEK portion to encrypt the respective DEK portion with a key encryption key (KEK). The respective third party associated with the respective DEK portion is different than the respective third party associated with each other DEK portion of the plurality of DEK portions. The operations further include receiving the encrypted DEK portion from the respective third party and storing the encrypted DEK portion.

This aspect may include one or more of the following optional features. In some implementations, after storing the encrypted DEK portion, the operations further include obtaining data encrypted by the DEK. For each respective DEK portion of the plurality of DEK portions, the operations include requesting the respective third party to decrypt the respective DEK portion and receiving the decrypted DEK portion from the respective third party. The operations may also include hashing the decrypted DEK portion and determining whether the hashed decrypted DEK portion is equivalent to the respective stored hashed DEK portion. When each of the hashed decrypted DEK portions are equivalent to the respective stored hashed DEK portions, the operations may further include combining the decrypted DEK portions to generate a combined DEK and decrypting the data using the combined DEK. Optionally, splitting the DEK into the plurality of DEK portions includes splitting the DEK into the plurality of DEK portions using Shamir's secret sharing algorithm.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A crucial advantage of a trusted execution environment (TEE) is the ability to perform remote attestation. Remote attestation allows software to remotely assess the authenticity of the TEE platform while also providing information about the code currently executing within the TEE. In addition, when the executing code is reproducibly buildable, remote attestation allows for verification that the TEE platform is executing the application that is expected to be executed. A main component of remote attestation is an attestation report (i.e., a TEE report) which is a data structure signed by the TEE platform that contains information identifying the code currently executing within the TEE. The report may be authenticated and/or verified and signed by a TEE platform provider which results in evidence that the code is executing on a genuine TEE platform.

Many existing applications today would greatly benefit from remote attestation. However, implementing traditional remote attestation may cause complications by requiring rewriting some or all of the application connection logic. However, these existing applications already typically use a protocol such as the Transport Layer Security algorithm for communication purposes.

Implementations herein are directed toward a remote attestation system that integrates remote attestation into a cryptographic protocol such as TLS by cryptographically binding communication sessions to a TEE. The system may establish a secure communication session with another computing device using a cryptographic protocol (e.g., TLS) that uses an ephemeral session key to protect data transmitted during the session. The system may bind an attestation report to the communication session via the ephemeral session key.

Figure 1:
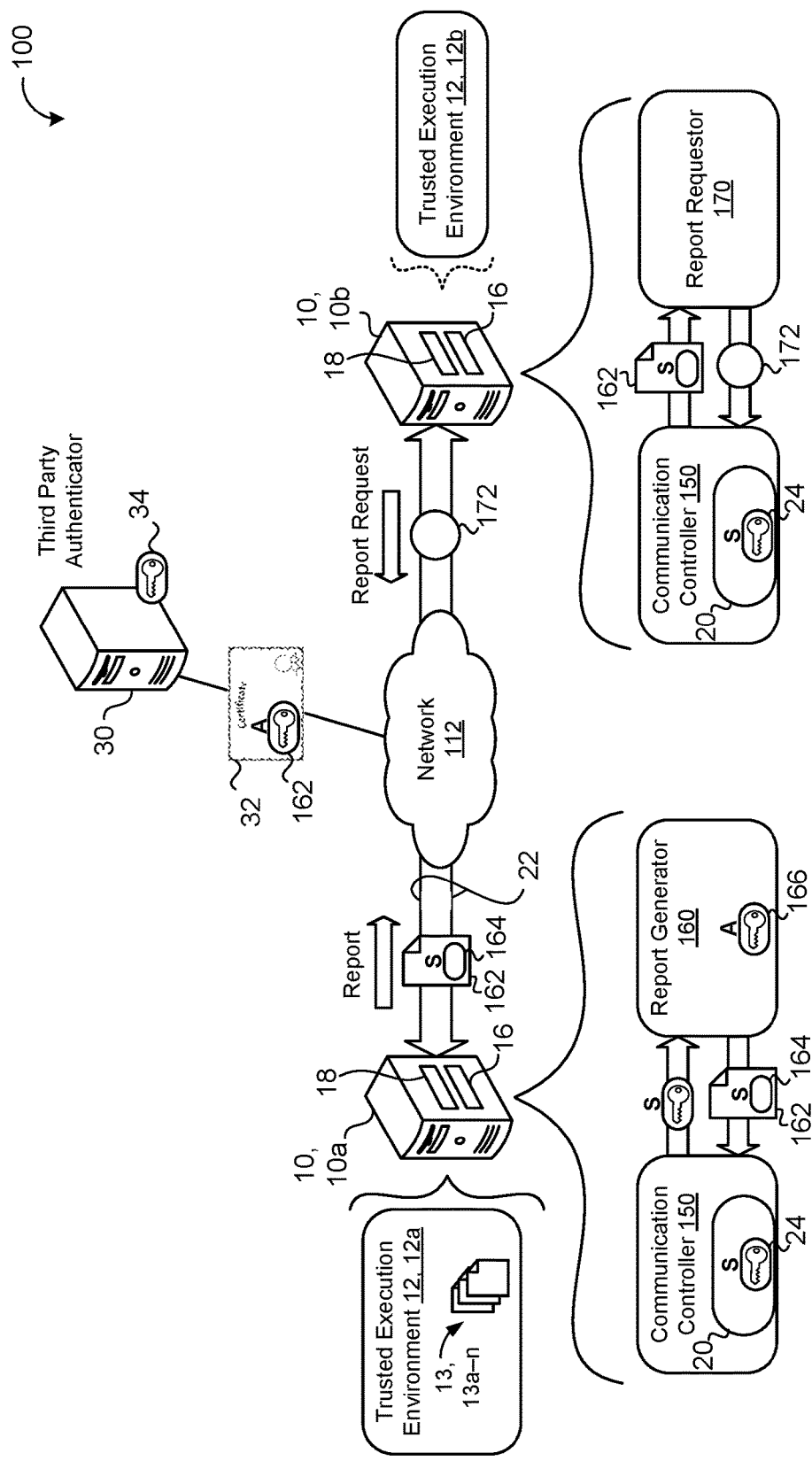
FIG. 1 is a schematic view of an example system for performing remote attestation.

Referring to FIG. 1, in some implementations, an example system 100 includes a first computing device 10, 10a in communication with a second computing device 10, 10b via a network 112. The computing devices 10 may correspond to any physical or virtual computing device, such as a desktop workstation, a laptop workstation, a server, or a mobile device (i.e., a smart phone). The computing device 10 includes computing resources 18 (e.g., data processing hardware) and/or storage resources 16 (e.g., memory hardware). Each computing device may be a single computer, multiple computers, or a distributed system (e.g., a cloud environment) having scalable/elastic computing resources 18.

One or both of the computing devices 10 include a trusted execution environment (TEE) 12a, 12b. The TEE 12 is a secure or trusted processing area for executing one or more applications 13, 13a-n that are separated or isolated from other processing areas of the computing device 10. The TEE 12 provides some guarantee that applications 13 and data loaded into the TEE 12 maintain at least some measure of integrity and confidentiality. Put simply, the TEE 12 offers an execution space that provides increased security for trusted applications relative to the general processing areas of the computing device 10 (e.g., the main operating system (OS)).

Each computing device 10 includes a communication controller 150. The communication controller 150 may execute within or outside the TEE 12. The communication controllers 150 establish, using a cryptographic protocol 20, a communication session 22. An ephemeral session key 24 protects communications between the computing devices 10 over the communication session 22. The session key 24 is a single-use symmetric key that encrypts all messages for the single communication session 22 only, after which the session key 24 is discarded and not reused. Each communication session 22 has a limited lifespan such that each session key 24 has a limited lifespan. The session key 24 may be established between the computing devices 10 using public-key cryptography (i.e., asymmetric cryptography) or any other appropriate means. In some examples, the cryptographic protocol 20 is a Transport Layer Security (TLS) protocol, which involves the computing devices 10 initially performing a handshaking procedure using an asymmetric cipher to establish the session-specific session key 24.

After establishing the communication session 22, the first computing device 10a receives, via the communication session 22, an attestation request 172 (e.g., using an HTTP request or an HTTPS tunnel) requesting that the first computing device 10a provide an attestation report 162. For example, an application executing on the second computing device 10b desires to confirm that status and/or integrity of one or more of the applications 13 executing within the TEE 12a of the first computing device 10a. A report requestor 170 generates the attestation request 172 and transmits the attestation request 172 to the first computing device 10a via the communication session 22.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The communication controller 150 of the first computing device 10a provides the attestation request 172 to a report generator 160. The report generator 160 (which may execute within the TEE 21), in response to the attestation request 172, generates the attestation report 162 using any conventional means. The attestation report may include a variety of information, such as confirmation that the first computing device 10a includes a properly instantiated TEE 12 (e.g., the version of the TEE 12), integrity measurements, event logs, and/or the identify and status of one or more of the applications 13 executing within the TEE 12. The attestation report 162 may establish the identity and/or the trustworthiness of the first computing device 10a and/or its TEE 12a.

The report generator 160, when generating the attestation report 162, binds the attestation report 162 and/or the TEE 12a to the communication session 22. To this end, the report generator 160 generates the attestation report 162 based on the ephemeral session key 24. In some examples, the report generator 160 generates a token 164 using the session key 24 (obtained from the communication controller 150) or a key derived from the session key 24. For example, the report generator 160 generates exported keying materials derived (e.g., via a hash-based key derivation function (HKDF)) from the session key 24. The derived key may be derived using a fixed set of parameters that do not change and is thus a deterministic algorithm. Therefore, when both computing devices 10a, 10b negotiate corresponding parameters or the parameters remain constant, both computing devices 10a, 10b will derive identical derived keys (or exported keying materials).

The exported keying materials may include additional information such as a label to disambiguate the exported keying materials between different applications 13, additional context to allow an application 13 to include data, and/or a length of the exported keying material. The report generator 160 may include the token 164 within the attestation report 162, thus binding the attestation report 162 to the communications session 22 via the session key 24. For example, the report generator 160 includes the token 164 (or the derived key or the session key 24) as custom data within the attestation report 162. Additionally or alternatively, the report generator 160 signs the attestation report 162 with the session key 24 or a key derived from the session key 24.

The report generator 160 and/or the communication controller 150 send, using the communication session 22, the attestation report 162 to the second computing device 10b. The report requestor 170 of the second computing device 10b may verify and/or authenticate the attestation report 162 at least in part by using the session key 24 that both computing devices 10a, 10b use to communicate over the communication session 22. The report requestor 170 authenticates the attestation report 162 by verifying that the attestation report 162 was generated by a valid TEE 12 and that the attestation report 162 includes the correct association with the session key 24 for the current communication session 22.

In some implementations, the report generator 160 signs the token 164 and/or the attestation report 162 with an attestation key 166. For example, the report generator 160 generates the token 164 using the session key 24 and then signs the generated token 164 using the attestation key 166. The authenticity of the attestation key 166 may be confirmed by a trusted third party 30. For example, the third party 30 issues a certificate 32 (e.g., an X.509 certificate) signed with a private key 34 of the third party 30. The second computing device 10b, upon receiving the attestation report 162 from the first computing device 10a, may confirm the authenticity of the attestation report 162 via the certificate 32 and the third party 30.

Figure 2:
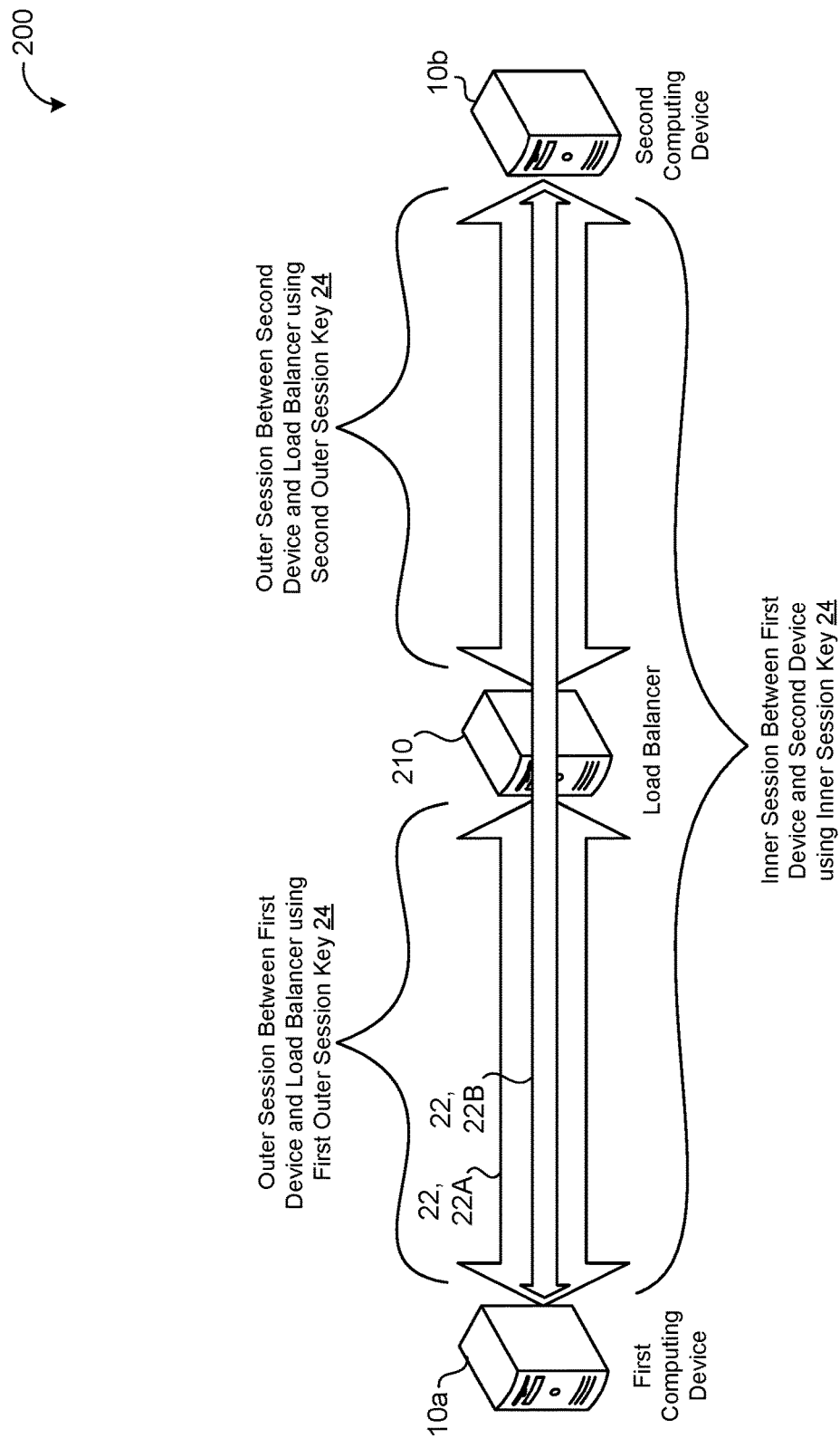
FIG. 2 is a schematic view of an inner communication session between two clients over an outer communication session.

Referring now to FIG. 2, a schematic view 200 includes an intermediary device 210 between the first computing device 10a and the second computing device 10b. The intermediary device 210 is a device that interrupts the communications between the first computing device 10a and the second computing device 10b. That is, the intermediary device 210 receives communications from the first computing device 10a and relays the communications on to the second computing device 10b and vice versa. Examples herein illustrate the intermediary device 210 as a load balancer, but any other intermediary device is equally application (e.g., a proxy). When an intermediary device 210 sits between the first computing device 10a and the second computing device 10b, the first computing device 10a establishes a communication session 22 with the intermediary device 210 and the second computing device 10b establishes an independent second communication session 22 with the intermediary device 210. The intermediary device 210 then "forwards" or otherwise relays the communications from the one communication session 22 to the other. In this scenario, the first computing device 10a and the second computing device 10b cannot rely on the confidentially of the session key 24 of their respective communication sessions, as the intermediary device 210 is also privy to these session keys 24.

In some implementations, the first computing device 10a and the second computing device 10b establish communications via an outer communication session 22, 22A using an outer cryptographic protocol 20. This communication session is mediated by the intermediary device 210 and uses two separate outer session keys 24. After the outer communication session 22A is established, via the outer communication session 22A, the first computing device 10a and the second computing device 10b establish an inner communication session 22, 22B using an inner cryptographic protocol 20 and a single inner session key 24. That is, using data communication over the outer communication session 22A, the computing devices 10a, 10b "tunnel" the inner communication session 22B through the outer communication session 22A. The intermediary device 210 is not privy to the session key 24 for the inner communication session 22B, and thus the first computing device 10a may safely bind the attestation report 162 to the inner communication session 22B using the respective session key 24. The outer cryptographic protocol 20 and the inner cryptographic protocol 20 may be different protocols. Alternatively, the outer cryptographic protocol 20 and the inner cryptographic protocol 20 are the same protocol (e.g., TLS).

In some implementations, the attestation capabilities of the system 100 are bidirectional. That is, both the first computing device 10a and the second computing device 10b can request and generate attestation reports 162 from the other computing device 10. In these implementations, both computing devices 10 execute a report generator 160 and a report requestor 170. Specifically, the first computing device 10a requests an attestation report 162 and the second computing device 10b generates the attestation report 162 in the same manner as already described above. For example, the first computing device 10a sends, via the communication session 22, a second attestation request 172. The first computing device 10a then receives, from the second computing device and via the communication session 22, a second attestation report 162. The first computing device 10a may authenticate the second attestation report using the session key 24. In some examples, the first computing device 10a also verifies the attestation key 166 of the second computing device 10b via a certificate issued by the trusted third party 30.

Figure 3:
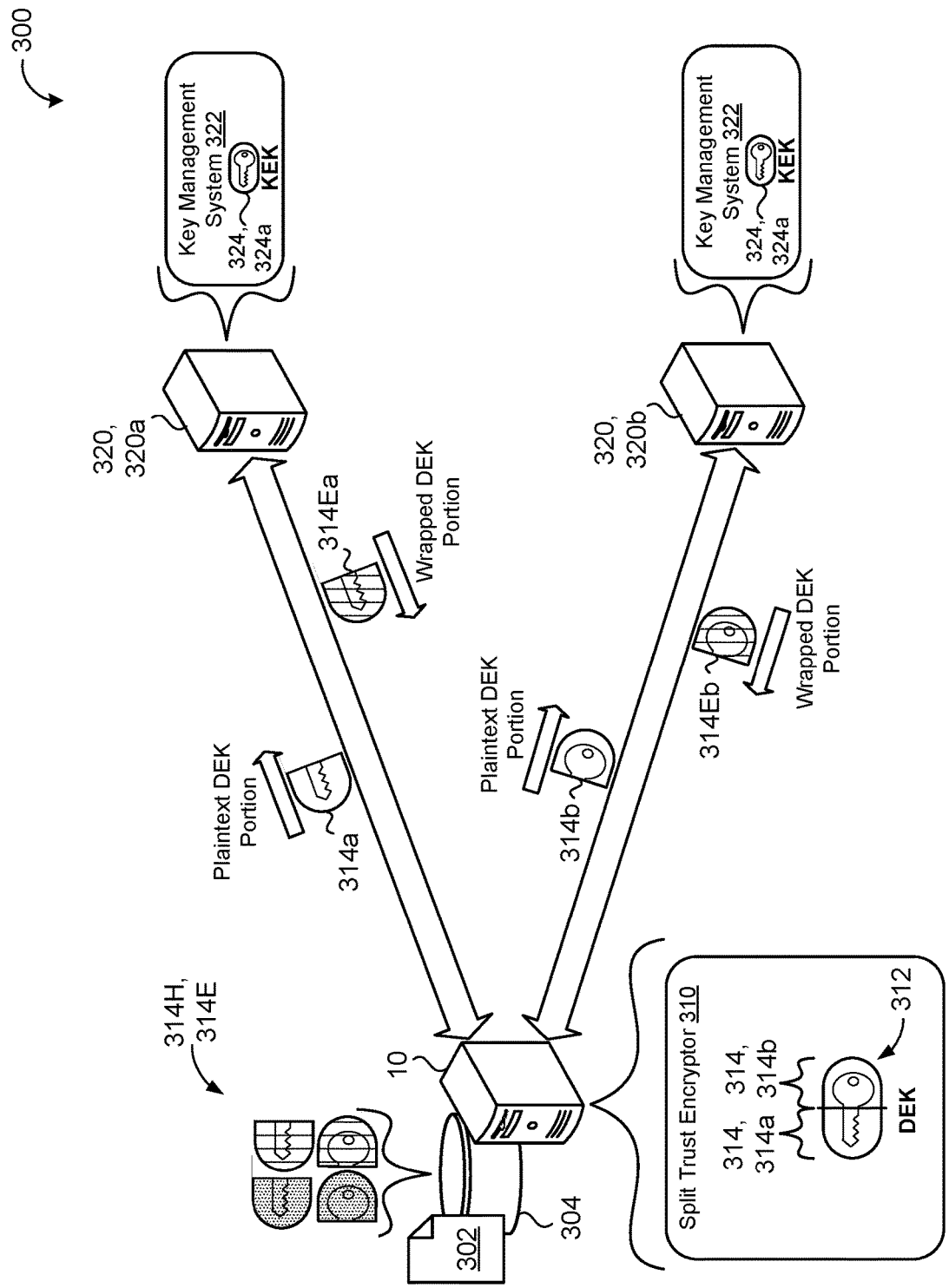
FIG. 3 is a schematic view of exemplary split trust encryption components of the system of FIG. 1.

Referring now to FIG. 3, in some examples, the system 100 includes split trust encryption. In some scenarios, it may be important that no single entity can unilaterally decrypt data. A schematic view 300 includes implementations where the computing device 10 splits portions of a data encryption key (DEK) 312 into a plurality of DEK portions 314, 314an and distributes the DEK portions 314 to different remote key management systems (KMS) 322.

In this example, the computing device 10 obtains data 302 to store at data store 304. The computing device 10 executes a split trust encryptor 310 that randomly generates a DEK 312. For example, the split trust encryptor 310 uses a cryptographically secure random number generator to derive the DEK 312. The split trust encryptor 310 encrypts the data 302 with the DEK 312 and then splits the DEK 312 into a number of DEK portions 314. Each DEK portion 314 represents a portion of the DEK 312. In some examples, the split trust encryptor 310 splits the DEK 312 using Shamir's Secret Sharing algorithm. Shamir's Secret Sharing algorithm allows the split trust encryptor 310 to split the DEK 312 into a (k, n) scheme where only kDEK portions 314 out of n DEK portions 314 are required to reassemble the DEK 312. While two portions are illustrated here for convenience, the split trust encryptor 310 may split the DEK 312 into any number of DEK portions 314 to distribute among any number of remote third parties 320.

The split trust encryptor 310 may hash each DEK portion 314 (e.g., using SHA-2) and store the hashed DEK portions 314H at the data store 304. The split trust encryptor 310 requests that a separate remote third party 320, 320a-n encrypt a respective DEK portion 314. Each remote third party 320 that receives a respective DEK portion 314 is different than each other remote third party 320 that receives a different DEK portion 314. That is, the split trust encryptor 310 transmits each plaintext (i.e., not hashed or encrypted) DEK portion 314 to a separate and different respective remote third party 320. Each remote third party 320 executes a key management system 322. The respective key management system 322 of each remote third party 320 encrypts their respective DEK portion 314 with a secret key encryption key (KEK) 324, 324a-n. Each remote third party 320 returns the encrypted (i.e., wrapped) DEK portion 314E, 314Ea-n to the computing device 10. The split trust encryptor 310 stores the encrypted DEK portions 314E at the data store 304. The split trust encryptor 310 may not retain any plaintext copies of the DEK 312, and thus requires each of the remote third parties 320 to decrypt their respective encrypted DEK portions 314E before the data 302 can be decrypted.

In this example, after the split trust encryptor 310 encrypts the data 302 with the DEK 312, the split trust encryptor 310 splits the DEK 312 into two DEK portions 314a, 314b. The split trust encryptor 310 hashes a copy of each DEK portion 314 and stores the hashed DEK portions 314H at the data store 304. The split trust encryptor 310 requests that a first remote third party 320a encrypt the first DEK portion 314a and also requests that a second remote third party 320b encrypt the second DEK portion 314b. The first remote third party 320a encrypts the first DEK portion 314a using a first KEK 324a that is known only by the key management system 322 of the first remote third party 320a. Likewise, the second remote third party 320b encrypts the second DEK portion 314b using a second KEK 324b that is known only by the key management system 322 of the second remote third party 320b. Both remote third parties 320a, 320b return their respective encrypted DEK portions 314Ea, 314Eb to the split trust encryptor 310. The split trust encryptor 310 stores the encrypted DEK portions 314E along with the hashed DEK portions 314H.

In order to recover the data 302 (i.e., decrypt the data 302 with the DEK 312), the split trust encryptor 310 obtains the encrypted DEK portions 314E from the data store 304 and sends the encrypted DEK portions 314E to each respective remote third party 320 along with a request to decrypt the encrypted DEK portions 314E. As discussed in more detail below, each remote third party 320 may authenticate or otherwise verify that the split trust encryptor 310 has access to the decrypted DEK portions 314 (e.g., via attestation reports 162) and after proper verification, decrypts the respective encrypted DEK portions 314E and transmits the plaintext DEK portions 314 back to the split trust encryptor 310. While examples herein describe the DEK portions 314 as being transmitted in plaintext, it is understood that the DEK portions 314 may be further encrypted via symmetric or asymmetric keys shared by the split trust encryptor 310 and the remote third parties 320.

Once the split trust encryptor 310 receives each decrypted DEK portion 314, the split trust encryptor 310 may combine the decrypted DEK portions 314 to generate or form the combined or complete DEK 312. The split trust encryptor 310 decrypts the data 302 using the combined DEK 312. At some point after decrypting the data 302, the split trust encryptor 310 may discard the plaintext DEK 312.

In some examples, the split trust encryptor 310, after receiving the decrypted DEK portions 314 from the remote third parties 320, the split trust encryptor hashes each decrypted DEK portion 314, using the same hash function as previously used on the DEK portions 314, and compares the newly hashed DEK portions 314H against the hashed DEK portions 314H stored at the data store 304. In this way, the split trust encryptor 310 may verify the integrity of the decrypted DEK 312 and, in the event of an invalid or incorrect DEK portion 314, the split trust encryptor 310 can determine which remote third party 320 provided the invalid DEK portion 314 and take action accordingly.

As briefly discussed above, both the split trust encryptor 310 and the remote third parties 320 may need to be able to verify the identity, integrity, and/or confidentiality of the other party before sharing and retrieving the DEK portions 314. To this end, the split trust encryptor 310 may establish independent communication sessions 22 using a cryptographic protocol 20 (e.g., via a network 112). As discussed with regards to FIGS. 1 and 2, the split trust encryptor 310 and/or each remote third party 320 may generate attestation requests 172 and attestation reports 162 to verify and authenticate the other party prior to encrypting, decrypting, or sharing any DEK portions 314. In this manner, for example, the remote third parties 320 may restrict access to use of the KEK 324 to only devices with valid attestation reports 162.

In some examples, after receiving or sending an attestation report 162, the split trust encryptor 310 receives, from a remote computing device 10, a first DEK portion 314 and, from a different remote computing device 10, a second DEK portion 314. The split trust encryptor 310 may combine the first DEK portion 314 and the second DEK portion and decrypt data using the combined DEK 312.

Figure 4:
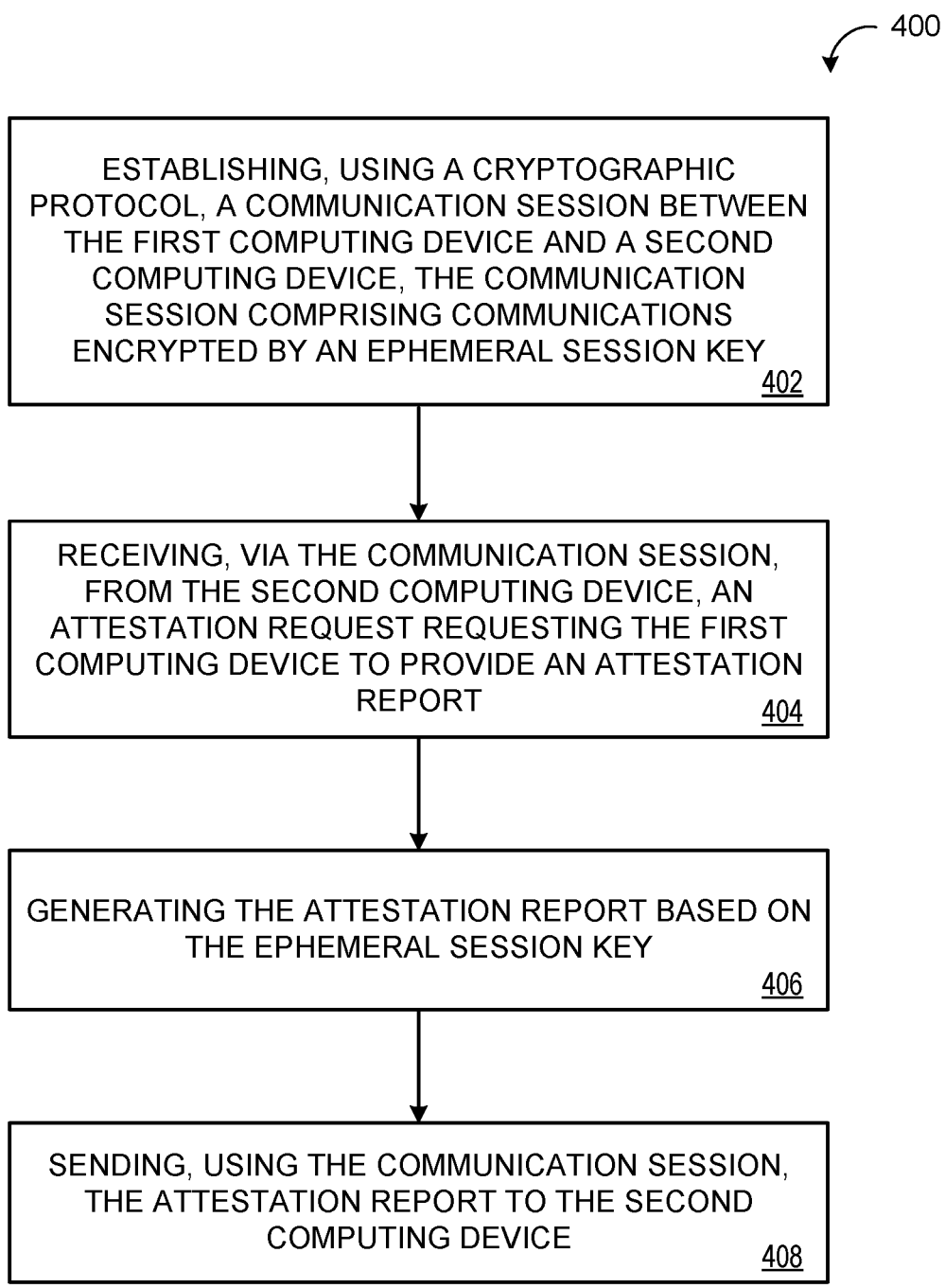
FIG. 4 is a flowchart of an example arrangement of operations for a method for remote attestation.

FIG. 4 is a flowchart of an exemplary arrangement of operations for a computer-implemented method 400 for performing remote attestation. The operations include, at step 402, establishing, using a cryptographic protocol 20, a communication session 22 between the first computing device 10a and a second computing device 10b. The communication session 22 includes communications encrypted by an ephemeral session key 24. At step 404, the operations include receiving, via the communication session 22, from the second computing device 10b, an attestation request 172 requesting the first computing device 10a provide an attestation report 162. At step 406, the operations include generating the attestation report 162 based on the ephemeral session key 24. The operations, at step 408, include sending, using the communication session 22, the attestation report 162 to the second computing device 10b.

Figure 5:
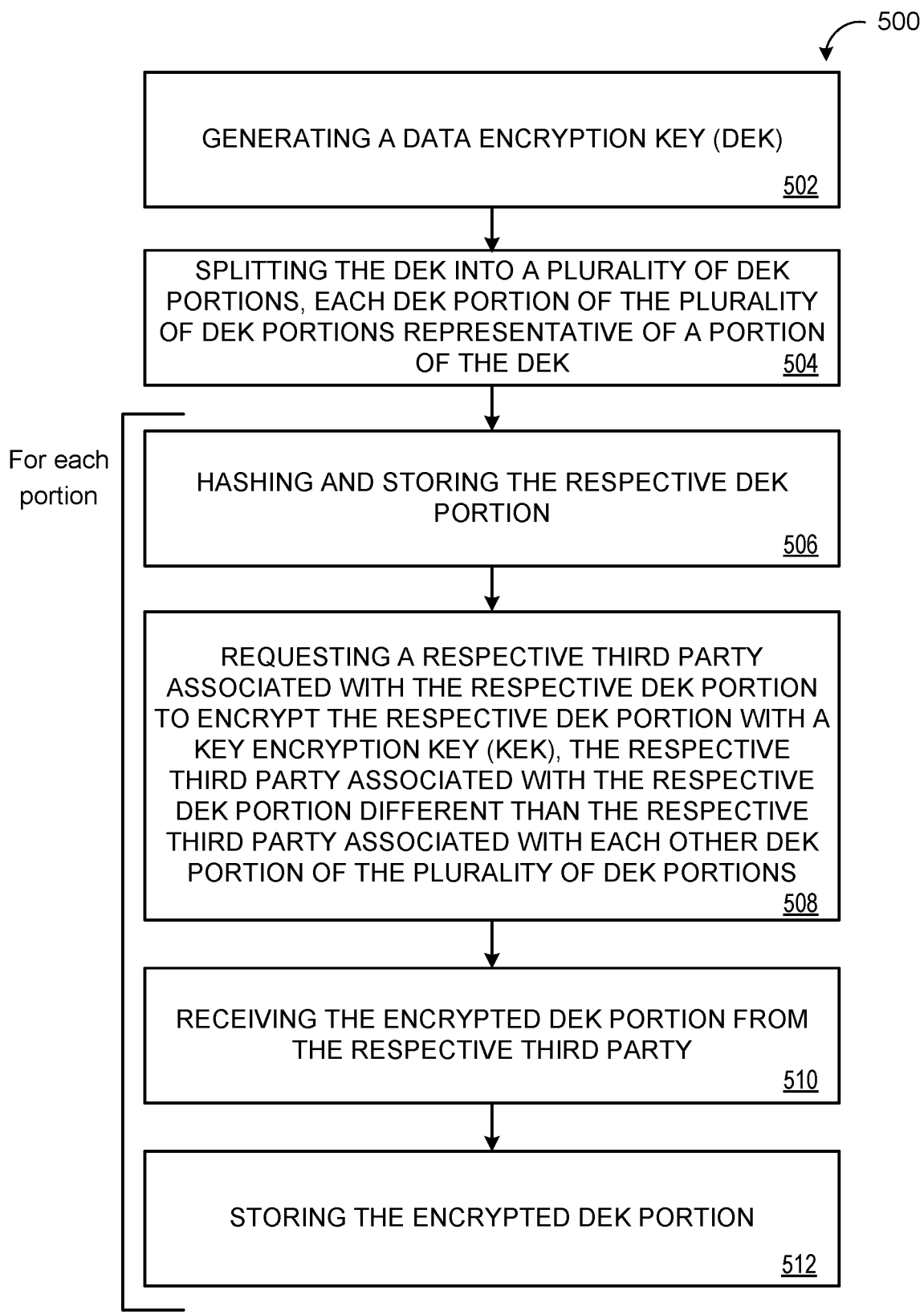
FIG. 5 is a flowchart of an example arrangement of operations for a method for split key encryption.

FIG. 5 is a flowchart of an exemplary arrangement of operations for a computer-implemented method 500 for performing split key encryption. The operations include, at step 502, generating a data encryption key (DEK) 312. At step 504, the operations include splitting the DEK 312 into a plurality of DEK portions 314. Each DEK portion 314 of the plurality of DEK portions 314 is representative of a portion of the DEK 312. At step 506, the operations include, for each respective DEK portion 314 of the plurality of DEK portions 314, hashing and storing the respective DEK portion 314. At step 508, the operations include requesting a respective remote third party 320 associated with the respective DEK portion 314 to encrypt the respective DEK portion 314 with a key encryption key (KEK) 324. The respective remote third party 320 associated with the respective DEK portion 314 is different than the respective remote third party 320 associated with each other DEK portion 314 of the plurality of DEK portions 314. At step 510, the operations include receiving the encrypted DEK portion 314E from the respective remote third party 320 and, at step 512, storing the encrypted DEK portion 314E.

Figure 6:
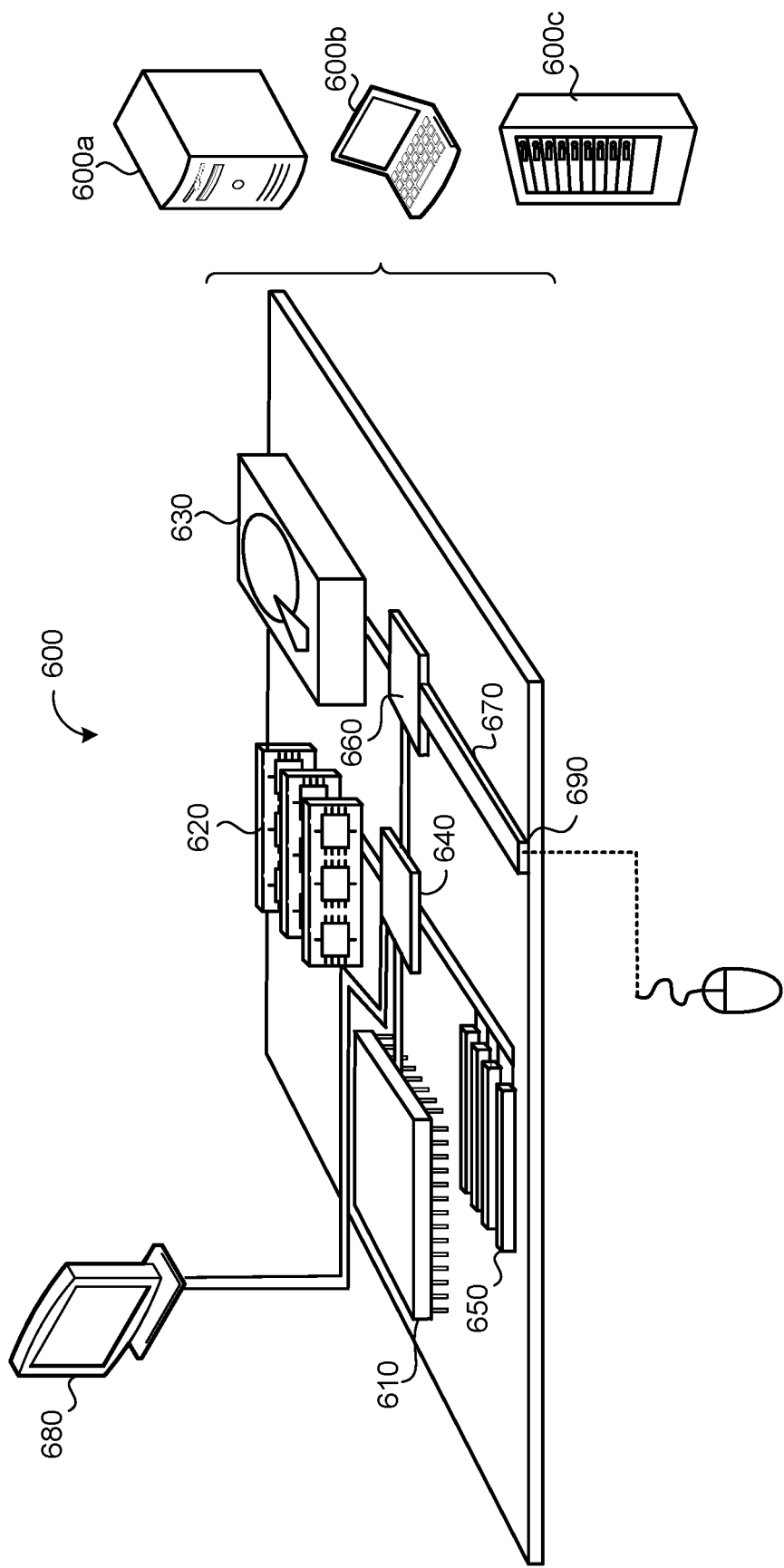
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware of a first computing device causes the data processing hardware to perform operations comprising:
generating a data encryption key (DEK);
splitting the DEK into a plurality of DEK portions, each DEK portion of the plurality of DEK portions representative of a portion of the DEK; and
for each respective DEK portion of the plurality of DEK portions:
hashing the respective DEK portion;
storing the respective hashed DEK portion;
requesting a respective third party associated with the respective DEK portion to encrypt the respective DEK portion with a key encryption key (KEK), the respective third party associated with the respective DEK portion different than the respective third party associated with each other DEK portion of the plurality of DEK portions;
receiving the encrypted DEK portion from the respective third party; and
storing the encrypted DEK portion.

2. The method of claim 1, wherein the operations further comprise, after storing the encrypted DEK portion:
obtaining data encrypted by the DEK;
for each respective DEK portion of the plurality of DEK portions:
requesting the respective third party to decrypt the respective DEK portion;
receiving the decrypted DEK portion from the respective third party;
hashing the decrypted DEK portion; and
determining whether the hashed decrypted DEK portion is equivalent to the respective stored hashed DEK portion;
when each of the hashed decrypted DEK portions are equivalent to the respective stored hashed DEK portions, combining the decrypted DEK portions to generate a combined DEK; and
decrypting the data using the combined DEK.

3. The method of claim 1, wherein splitting the DEK into the plurality of DEK portions comprises splitting the DEK into the plurality of DEK portions using Shamir's secret sharing algorithm.

* * * * *